United States Patent [19]

Gruczelak et al.

[11] 4,419,703
[45] Dec. 6, 1983

[54] DISC CARTRIDGE LOADING MECHANISM

[75] Inventors: Norman P. Gruczelak, Thousand Oaks; Phillip S. Bryer, Woodland Hills, both of Calif.

[73] Assignee: DMA Systems Corporation, Goleta, Calif.

[21] Appl. No.: 321,410

[22] Filed: Nov. 16, 1981

[51] Int. Cl.³ .............................................. G11B 5/012
[52] U.S. Cl. ...................................... 360/97; 360/133
[58] Field of Search ..................................... 360/97–99, 360/86, 133; 206/444

[56] References Cited

U.S. PATENT DOCUMENTS

| | | | |
|---|---|---|---|
| 3,593,327 | 7/1971 | Shill | 360/133 X |
| 3,899,794 | 8/1975 | Brown, Jr. | 360/133 |
| 3,973,273 | 8/1976 | Lissner et al. | 360/98 |
| 4,120,012 | 10/1978 | Bowers | 360/133 |
| 4,208,681 | 6/1980 | Hatchett | 360/97 |
| 4,320,430 | 3/1982 | Vogt | 360/97 X |

Primary Examiner—John H. Wolff
Attorney, Agent, or Firm—Spensley, Horn, Jubas & Lubitz

[57] ABSTRACT

The present invention relates to a magnetic disc storage system of the type including a housing having an openable front door for receipt of a cartridge containing a rigid magnetic disc. When the front door is open, a compartment is exposed for receipt of the cartridge, which compartment is completely sealed from another compartment containing the transducer heads. It is only when a cartridge is fully inserted into the compartment and the front door closed that the compartment containing the heads is opened and the door in the cartridge is opened. This system provides for positive control against external contamination entry into the head flying environment.

12 Claims, 15 Drawing Figures

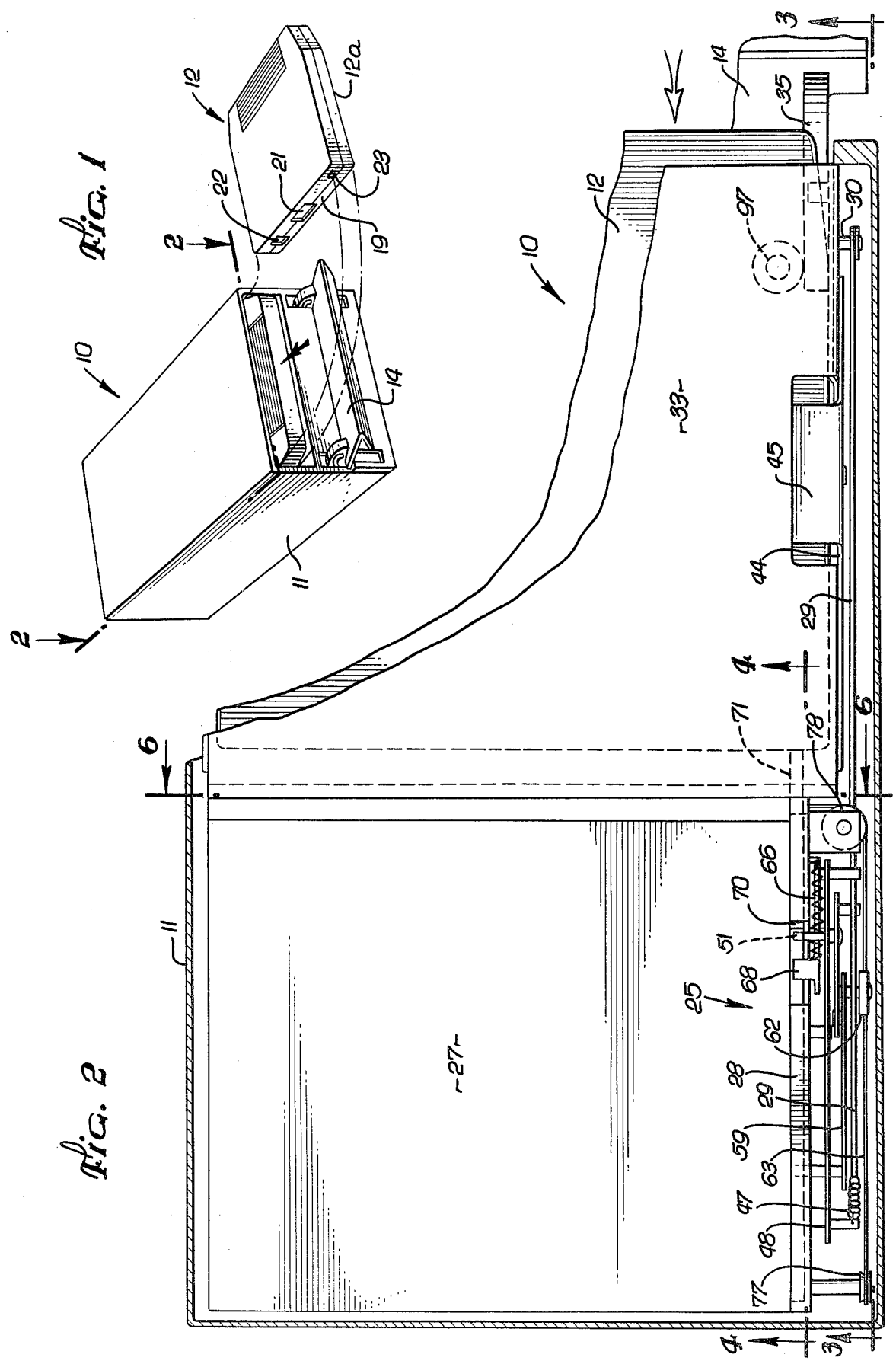

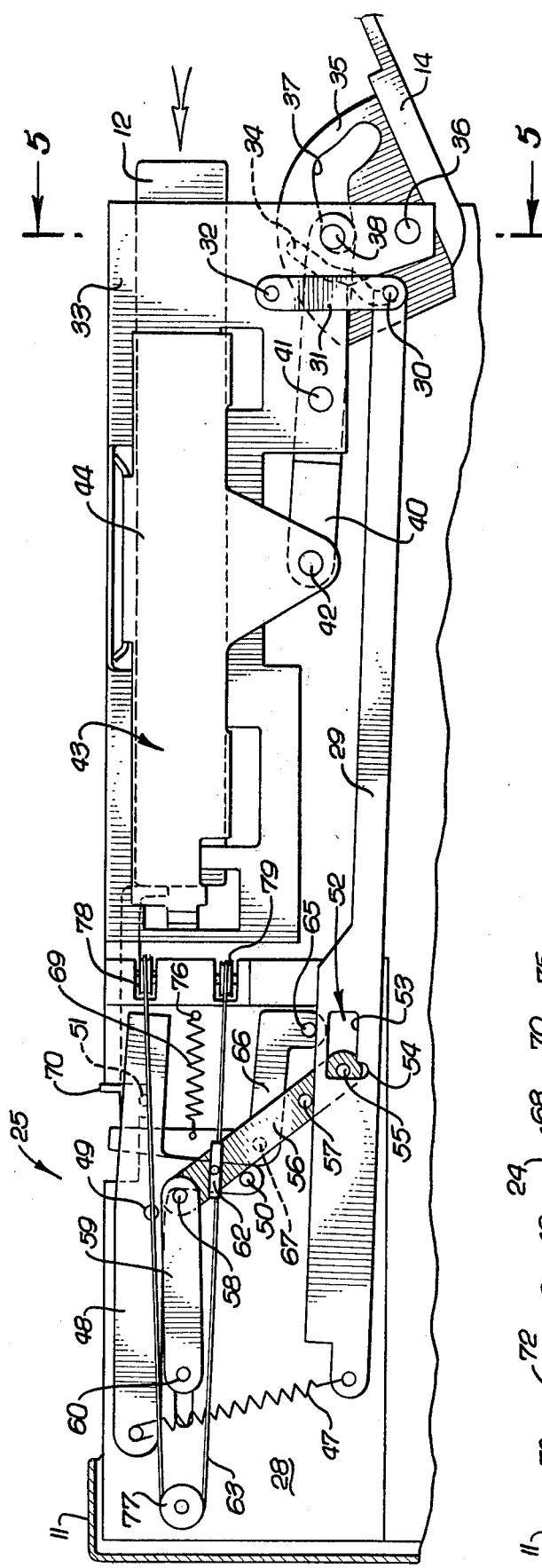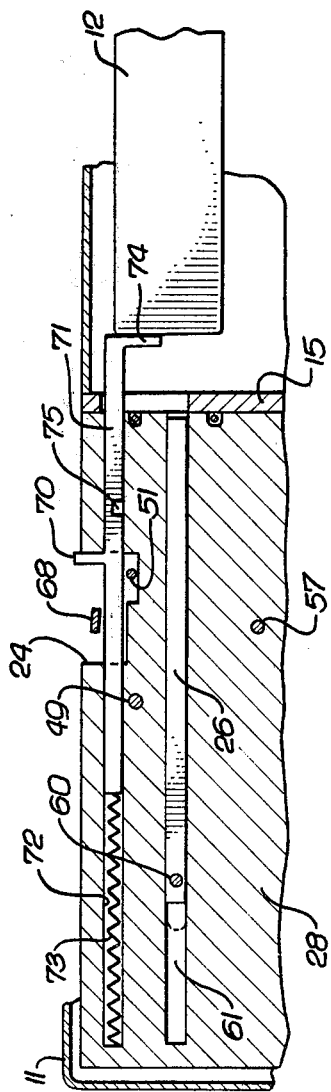

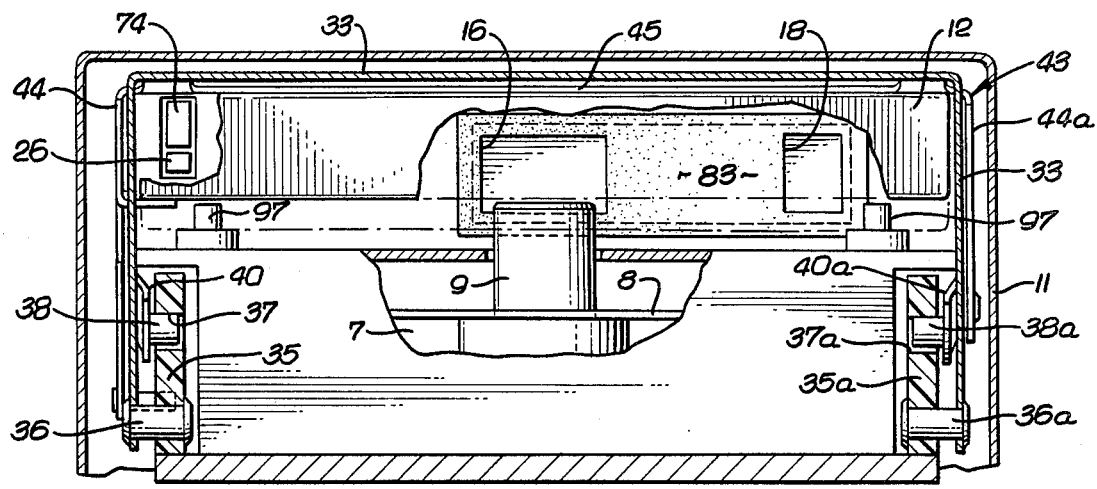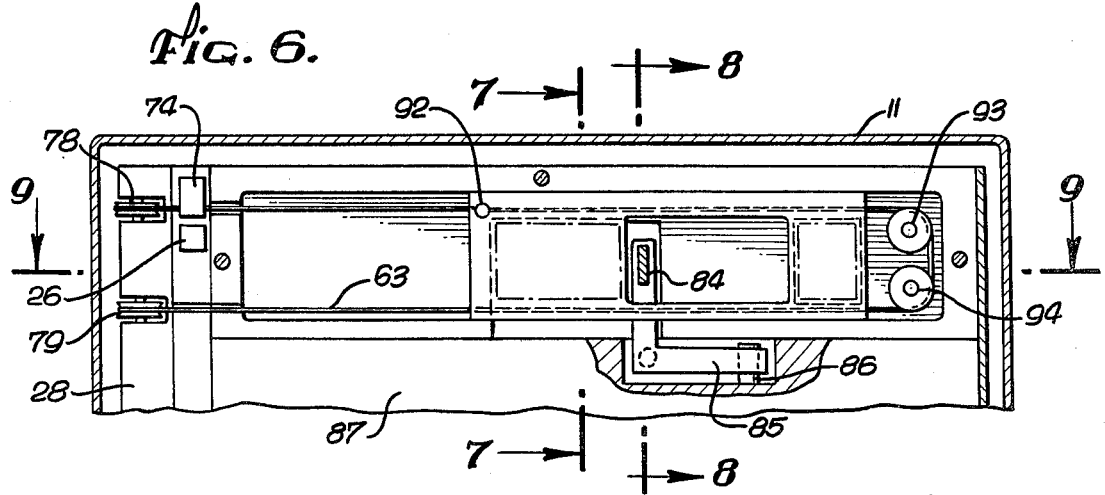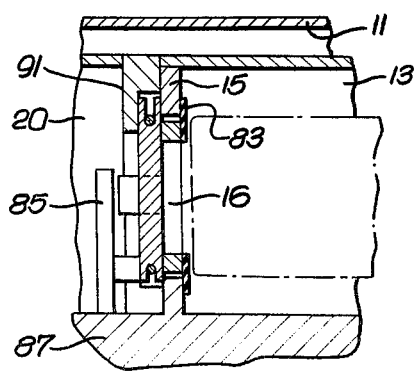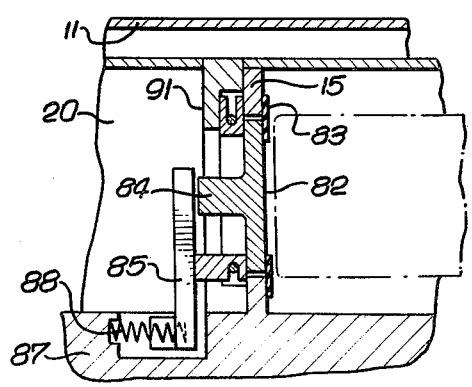

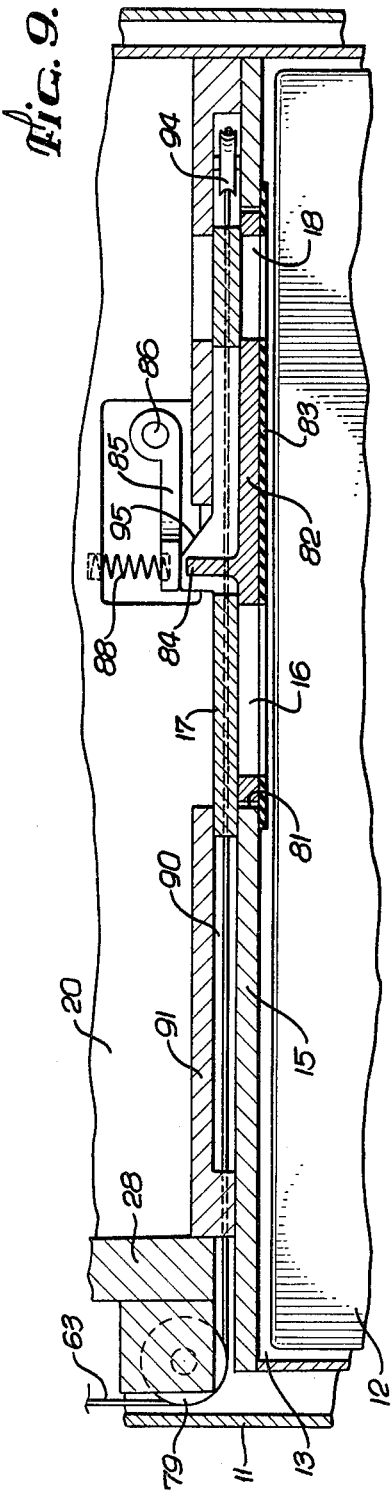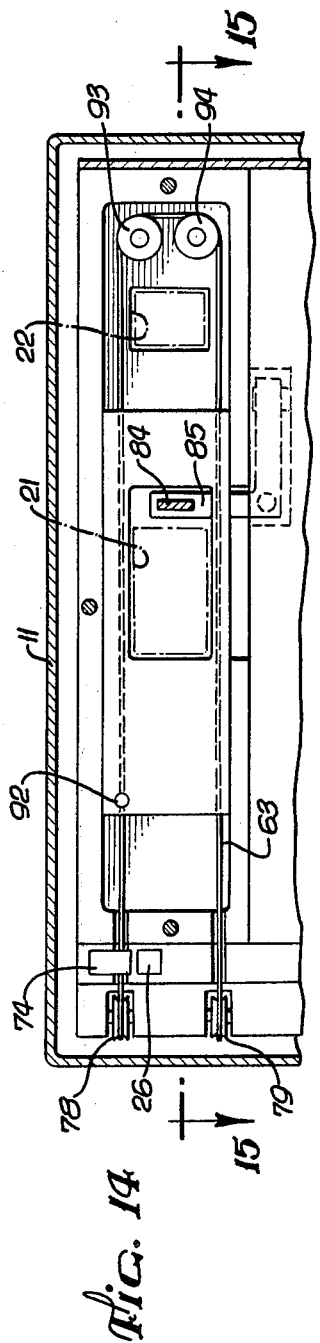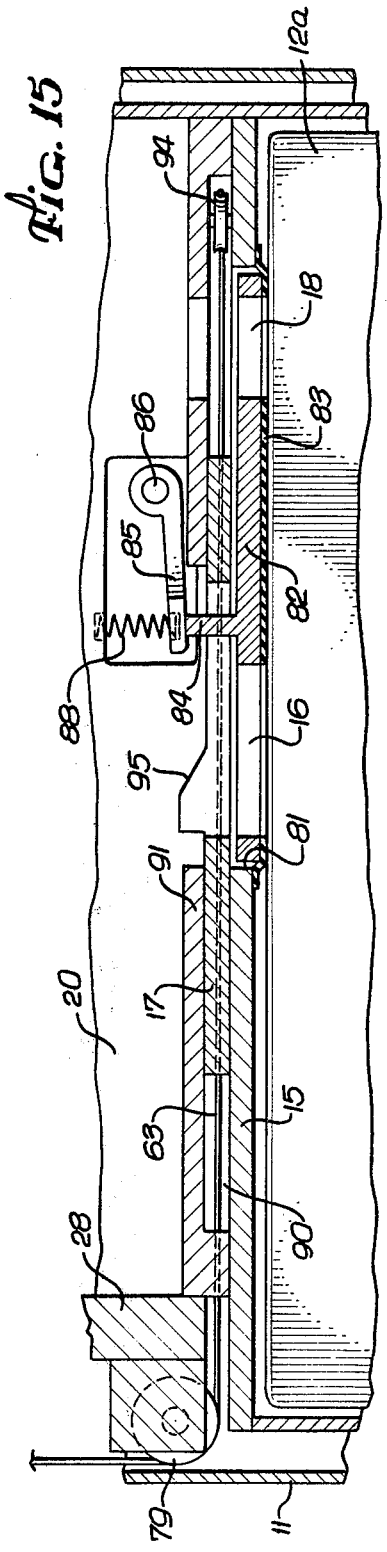

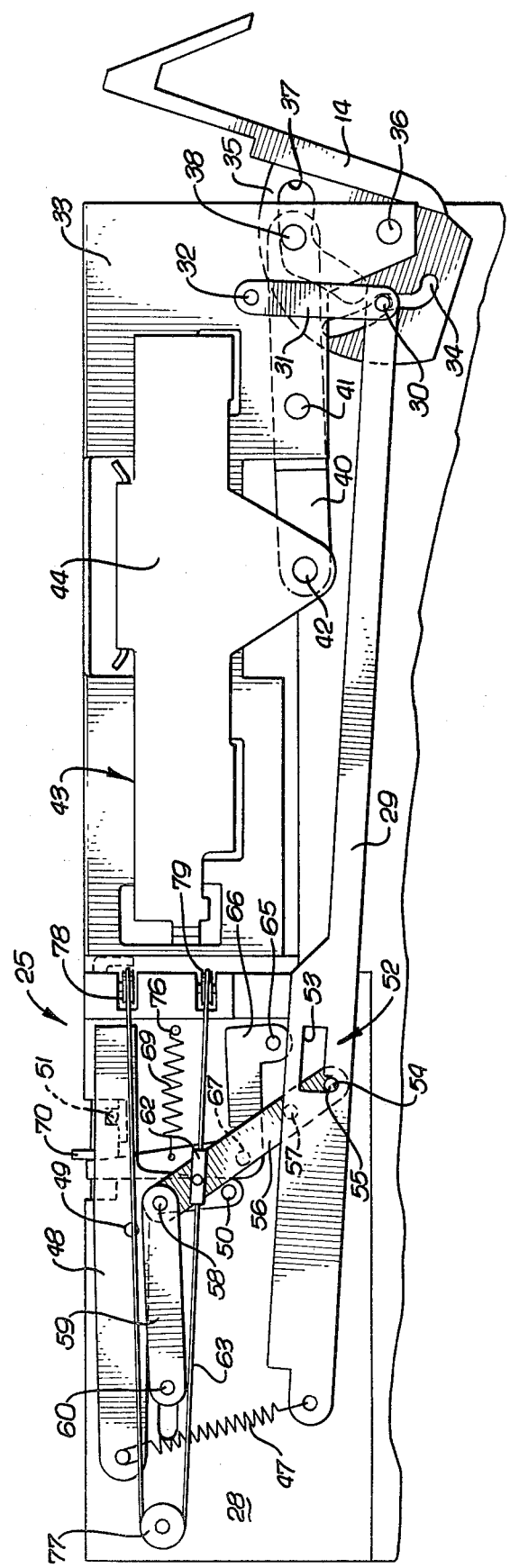

DISC CARTRIDGE LOADING MECHANISM

BACKGROUND OF THE INVENTION

1. Field of the Invention

The present invention relates to a disc cartridge loading mechanism and, more particularly, to a loading mechanism for a magnetic disc storage system of the type incorporating a removable disc cartridge which provides for positive control against external contamination entry into the head flying environment.

2. Description of the Prior Art

Magnetic disc storage systems are widely used to provide large volumes of relatively low-cost, computer-accessible memory or storage. A typical disc storage device has a number of discs coated with a suitable magnetic material mounted for rotation on a common spindle and a set of transducer heads carried in pairs on elongated supports for insertion between adjacent discs, the heads of each pair facing in opposite directions to engage opposite faces of adjacent discs. The support structure is coupled to a positioner motor, the positioner motor typically including a coil mounted within a magnetic field for linear movement and oriented relative to the discs to move the heads radially over the disc surfaces to thereby enable the heads to be positioned over any annular track on the surfaces. In normal operation, the positioner motor, in response to control signals from the computer, positions the transducer heads radially for recording data signals on, or retrieving data signals from a pre-selected one of a set of concentric recording tracks on the discs.

The transducer heads are supported above the disc surfaces by a film of air to prevent contact therebetween which might otherwise damage one or both members. Modern magnetic disc drives incorporate rigid substrate discs, the surfaces of which are polished to a high finish so that the heads can reliably fly on the air bearing. Systems are presently being developed wherein the heads fly above the disc recording surfaces at heights of less than 20 microinches.

In such a magnetic disc drive, it is extremely important to control the cleanliness of the head flying environment. The presence of contamination particles on a disc may effect the flight attitude of the heads and thereby reduce their ability to record and retrieve data from the disc surfaces. In the extreme, the presence of disc contamination may cause a crash of a flying head, causing destruction of the head and/or disc.

Accordingly, a typical magnetic disc drive incorporates a filtered air system to control cleanliness of the head flying environment. It is very common in disc pack drives or disc cartridge drives to incorporate a purging cycle, wherein the disc is brought up to rotationaal speed and some period of time is spent with the disc rotating in the presence of a filtered air flow before the heads are moved into proximity with the disc.

In fixed disc systems, it is relatively easy to maintain cleanliness of the head flying environment. On the other hand, there is presently a strong market demand for media removability. Accordingly, rigid discs presently are sold in data cartridges which incorporate various features to protect the media for flight. Drives configured to make use of this type of cartridge incorporate, in general, certain features. A front door is incorporated that allows insertion of the cartridge. When this door is open, the volume containing the flying heads is generally exposed to the outside environment of the drive, thereby exposing the heads and their support structure to contamination while the cartridge is inserted.

To protect the disc in the cartridge when it is external from the machine, the disc typically includes a plurality of doors which are normally closed to the outside environment. The cartridge also includes an opening for receipt of a puch rod which, when inserted in this opening, opens the doors. In a typical disc cartridge drive, as the cartridge is pushed into the drive, a stationary push rod enters the door mechanism opening to open the sliding door to allow for entry of the heads during drive operation. This door opening occurs well before the cartridge is fully seated. Accordingly, this technique opens the cartridge to the previously contaminated drive environment, allowing contamination to enter the cartridge. As a result, previous disc cartridge drives have presented problems in the area of long term product reliability.

SUMMARY OF THE INVENTION

According to the present invention, there is provided a cartridge loading mechanism for a removable cartridge magnetic disc drive system in which these possibilities for contamination entry are minimized. With the present magnetic disc drive, a door system is incorporated into the disc drive so that the compartment containing the heads is sealed against outside contamination at all times when the cartridge is outside the drive. The door on the cartridge as well as the door on the drive are not open until the cartridge is fully inserted into the drive and sealed to the head chamber by a coupling gasket. This provides for positive control against external contamination entry into the head flying environment.

Briefly, in a magnetic disc storage system of the type including a housing adapted for receipt of a disc cartridge, the cartridge including a housing having a wall having first and second openings therein, the first opening having a movable door extending thereacross, the second opening being adapted for receipt of an opener rod for opening and closing the cartridge door, the system housing having an open-ended compartment for receipt of the cartridge, a wall at the closed end of the compartment having an opening therein positioned to be aligned with the first opening in the cartridge housing wall, and a head carriage movable through the aligned openings for engaging the disc in the cartridge, there is disclosed a door activation mechanism comprising a movable shutter in the system housing adopted for movement between a first position sealing the opening in the system housing wall and a position clear of the opening; means for moving the shutter; an opener rod mounted for linear movement in the system housing; means for moving the opener rod for opening and closing the cartridge door; and means responsive to a cartridge being inserted into the compartment for inhibiting operation of the shutter moving means and the opener rod moving means until the cartridge is fully inserted into the compartment.

OBJECTS, FEATURES AND ADVANTAGES

It is therefore the object of the present invention to solve the problem of external contamination entry into the head flying environment in a magnetic disc storage system. It is a feature of the present invention to solve this problem (1) by incorporating a door system into the magnetic disc storage system so that the compartment containing the heads is sealed against outside contamination at all times when the cartridge is outside of the system and (2) by providing a cartridge loading mechanism whereby the door on the cartridge, as well as the door in the storage system, are not opened until the cartridge is fully inserted into the system and sealed to the head chamber by a coupling gasket. An advantage to be derived is the ability to positively control the entry of external contamination into the head flying environment. A further advantage is a significant increase in long term product reliability. A still further advantage is a removable disc cartridge magnetic disc storage system in which the head flying environment is substantially isolated from the contaminated environment.

Still other objects, features and attendant advantages of the present invention will become apparent to those skilled in the art from a reading of the following detailed description of the preferred embodiment constructed in accordance therewith, taken in conjunction with the accompanying drawings wherein like numerials designate like parts in the several figures and wherein:

BRIEF DESCRIPTION OF THE DRAWINGS

FIG. 1 is a perspective view of a magnetic disc storage system incorporating the present cartridge loading mechanism shown with the front door open adapted for receipt of a rigid disc cartridge;

FIG. 2 is an enlarged sectional view taken along the line 2—2 in FIG. 1;

FIGS. 3 and 4 are sectional views taken along the lines 3—3 and 4—4, respectively, in FIG. 2;

FIG. 5 is a sectional view taken along the line 5—5 in FIG. 3;

FIG. 6 is a sectional view taken along the line 6—6 in FIG. 2;

FIGS. 7, 8 and 9 are partial sectional views taken along the lines 7—7, 8—8, and 9—9, respectively, in FIG. 6;

FIG. 10 is a sectional view like FIG. 3, but showing the front door in a partially closed position;

FIG. 11 is a sectional view like FIG. 4, but showing a cartridge fully inserted into the magnetic disc storage system compartment;

FIG. 14 is a sectional view like FIG. 6, but showing the shutter in its open position; and FIG. 15 is an enlarged sectional view taken along the line 15—15 in FIG. 14.

DESCRIPTION OF THE PREFERRED EMBODIMENT

Figure 12:
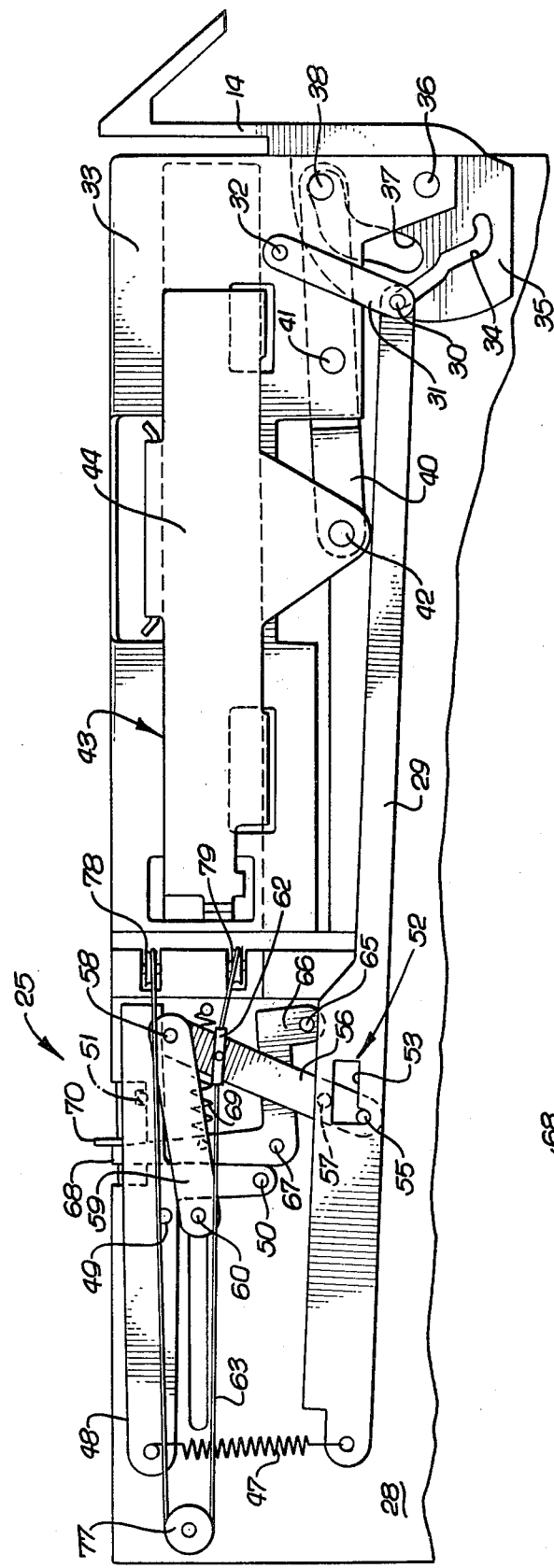
FIG. 12 is a sectional view like FIG. 3, but showing the front door in its fully closed position.

Referring now to the drawings and, more particularly, to FIGS. 1-5 thereof, there is shown a magnetic disc storage system, generally designated 10, of the type which includes a spindle 9 (the end of which is seen in FIG. 5) supporting one or more magnetic discs 8. Storage system 10 includes a main housing 11. According to the present invention, a first disc 8 is positioned within a sealed compartment 7 and is permanently fixed to spindle 9, whereas another disc is user-replaceable. The user-replaceable disc is maintained in a disc cartridge 12 including an outer housing 12a. As is well known to those skilled in the art, spindle 9 is driven by a spindle motor (not shown) which rotates discs 8 about an axis defined by spindle 9.

Modern magnetic disc drives incorporate rigid substrates for discs 8. These substrates have a magnetic material coated on either one or both surfaces thereof to enable data to be magnetically recorded thereon. Data is recorded on the disc surfaces by signals applied to magnetic transducers (not shown), typically referred to as "heads". In a typical disc drive, a head support structure (not shown) is provided, the head support structure typically including, for each disc 8, a support arm (not shown), all of which support arms are connected to a common carriage (not shown). The carriage is physically coupled to a positioner coil (not shown) of a linear positioner motor (not shown) which, in response to the application of positioning signals thereto, is capable of linearly moving the support structure. The support structure is mounted relative to discs 8 so that the heads may move radially with respect to the recording surfaces thereof. That is, the support structure can be moved linearly to enable the heads to be selectively positioned over any one of a plurality of annular recording tracks defined on the disc recording surfaces.

In normal operation, that is, when the heads are writing data onto or retrieving data from the surfaces of the discs, the heads will be loaded. When heads are loaded, it simply means that a spring force is acting upon the heads, generally through the support arms, to urge the heads toward the surfaces of the discs. This force is counteracted by an air cushion caused by the rapid rotation of the discs, so that the heads actually fly immediately above the disc recording surfaces. In modern magnetic disc drives, the heads may fly at distances less than 50 microinches above the disc surfaces and drive systems are presently being developed where heads may fly at distances of less than 20 microinches above the disc surfaces.

Magnetic disc drives, such as disc drive 10, typically incorporate filtered air systems to control the cleanliness of the head flying environment. For this purpose, housing 11 is preferably divided into at least three compartments 7, 13 and 20 (FIGS. 5 and 7). Compartment 13 is the only compartment which is openable to the outside environment. That is, compartment 13 is closed on five sides thereof, but is open at the front thereof (FIG. 1), the opening being adapted to be closed by a pivotable door 14. Positioned directly below compartment 13 is compartment 7 which contains spindle 9 and fixed disc 8. Spindle 9 also extends through the dividing wall between compartments 7 and 13 so that a disc inserted into compartment 13 may be seated thereon. Immediately behind compartments 7 and 13 is compartment 20, to the left in FIGS. 2, 3 and 7, which houses the heads, the head support structure and the positioner motor. Compartment 20 is separated from compartment 13 by a wall 15 (FIG. 9).

A pair of heads (not shown), mounted at the ends of support arms (not shown), may extend into compartment 13 to be loaded on a disc 8 therein. On the other hand, such arms and heads may be retracted into compartment 20 through an opening 16 in wall 15 when it is desired to remove cartridge 12. A movable shutter 17 may be used to seal opening 16 so as not to expose the heads to the outside environment during disc removal.

Dirty air is conducted from cartridge 12 in compartment 13 via a second opening 18 in wall 15, shutter 17 also being adapted to seal opening 18. Such air is conducted through opening 18 under power of a blower fan (not shown). This dirty air is conducted through an air filter and then into compartment 7 and then back into cartridge 12 in compartment 13. For a more complete description of a filtered air system, reference should be had to copending application Ser. No. 321,335, filed concurrently herewith, entitled Method for Contaiminant Purging and Head Loading in a Magnetic Disc Drive, and assigned to DMA Systems Corporation, the assignee of the present application.

This air is adapted to be circulated through cartridge 12 which contains a rigid disc 8 (not shown). For this purpose, cartridge 12 has a wall 19 at one end thereof which is adapted to be positioned parallel to and adjacent wall 15. Wall 19 has first and second openings 21 and 22 therein which are adapted to be aligned with openings 16 and 18, respectively. In this manner, air is circulated through cartridge 12. Openings 21 and 22 in cartridge 12 have movable doors (not shown) extending thereacross for sealing same to maintain cleanliness of the disc therein when cartridge 12 is removed from system 10. The opening and closing of the doors in cartridge 12 is controlled by a mechanism (not shown), access to which is achieved through an opening 23 in wall 19. Opening 23 does not provide access to the main compartment in which the disc is located. Rather, opening 23 only provides access to the door opening mechanism which is activated by a door opening rod extending into opening 23. This construction of cartridge 12 is well known to those skilled in the art.

As explained previously, previous magnetic disc storage systems have incorporated contamination control features such as cartridge doors and seals to control contamination entry into cartridge 12 while outside system 10 and outer doors such as door 14 to close off the drive head environment when the drive is not in use. In general, however, previous solutions opened the head environment to outside contamination if the system door is opened with no catridge present (i.e., everytime the door is opened to insert a cartridge). In addition, any contamination carried on the outside of the cartridge into the cartridge chamber is not sealed from the heads when the front door is closed.

Furthermore, previous disc drives contain a stationary opener rod which extends into opening 23 in cartridge 12 as cartridge 12 is inserted therein. Accordingly, the doors sealing openings 21 and 22 are opened before cartridge wall 19 is sealed against an internal wall, such as wall 15.

According to the present invention, these problems are solved by the inclusion of a door activation mechanism, generally designated 25. Mechanism 25 performs a number of functions, one of which is to control the movement of shutter 17, such movement being permitted only after cartridge 12 is fully inserted into compartment 13 with wall 19 thereof adjacent wall 15.

Figure 13:
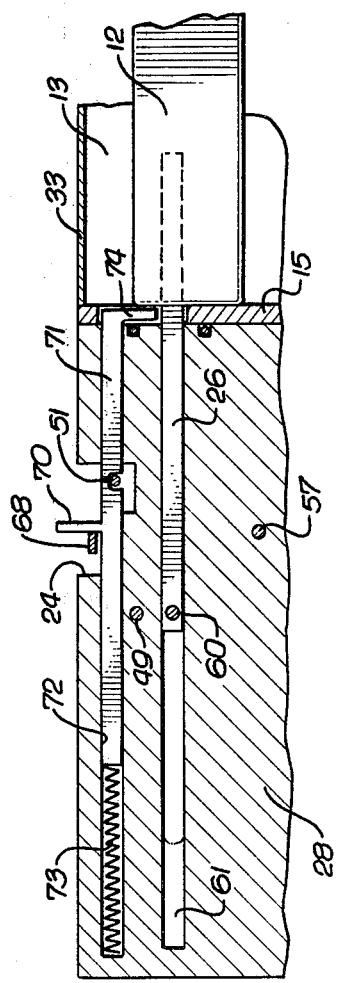
FIG. 13 is a sectional view like FIG. 4, but showing the cartridge door opener rod in its fully extended position.

Mechanism 25 also includes a movable cartridge opener rod 26 mounted for linear movement within housing 11. Rod 26 is movable between a first, fully retracted position (FIG. 4) and a second, fully extended position (FIG. 13), in which second position it activates the door opening mechanism in cartridge 12. Mechanism 25 controls the movement of rod 26, movement of rod 26 only being permitted when cartridge 12 is fully inserted into compartment 13 with wall 19 adjacent wall 15.

Still referring primarily to FIGS. 1-5, positioned within housing 11 is a top support plate 27 and a side support plate 28. A major portion of mechanism 25 is positioned between side plate 28 and housing 11 (FIG. 2). Mechanism 25 includes a main actuating arm 29, one end of which is connected by means of a pin 30 to one end of a linkage 31. The other end of linkage 31 is connected by means of a pin 32 to a stationary u-shaped frame member 33 (FIG. 5) which is positioned within housing 11, surrounding compartments 7 and 13. In addition to connecting arm 29 and linkage 31, pin 30 functions as a cam follower and extends into a cam channel 34 in an actuating member 35 secured to one end of door 14. A similar member 35a is secured to the other end of door 14. Members 35 and 35a are pivotably connected to frame member 33 by means of pins 36 and 36a, respectively. As will appear more fully hereinafter, loading mechanism 25 is completely controlled by means of door 14.

Member 35 has a second cam channel 37 therein and member 35a has an identical cam channel 37a therein which receive pins 38 and 38a, respectively, functioning as cam followers. Pins 38 and 38a are connected to first ends of pivotal arms 40 and 40a, respectively, which are pivotably connected to frame member 33 by central pins 41. The other ends of arms 40 and 40a are connected by means of pins 42 to a horizontally movable, U-shaped elevator member 43. Elevator member 43 includes two opposed sides 44 and 44a which are interconnected at the upper ends thereof by a cross member 45. As will be explained more fully hereinafter, cartridge 12 is inserted into frame member 33 and extends between sides 44 and 44a of elevator member 43, below cross member 45. Elevator member 43 functions to lower cartridge 12 onto the free end of spindle 9 which extends into compartment 13 from the bottom thereof. Elevator member 43 also lowers cartridge 12 onto fixed locating pins 97 positioned on the dividing wall between compartments 7 and 13.

The other end of arm 29 is connected by means of a spring 47 to the first end of a generally T-shaped pivotal linkage 48. Linkage 48 pivots around a pin 49 which extends into side plate 28. Linkage 48 supports a pin 50 which extends away from side plate 28 and a pin 51 which extends toward side plate 28. In fact, pin 51 extends into a cutout 24 in the top of side plate 28 (FIG. 4). Spring 47 applies a counterclockwise bias to linkage 48 and an upward bias to arm 29.

Arm 29 has a generally L-shaped opening 52 therein including a main portion 53 and a secondary portion 54. Extending into opening 52 is a pin 55 connected to one end of a linkage 56. Linkage 56 is mounted for pivotal movement about a pin 57 connected to side plate 28. The other end of linkage 56 is connected by means of a pin 58 to one end of an arm 59. The other end of arm 59 is connected by means of a pin 60 to one end of opener rod 26 which is positioned within an open-sided channel 61 in side plate 28. Also connected to linkage 56, adjacent pin 58, is an anchor 62 to which is connected the opposite ends of a cable 63.

Resting on the upper surface of arm 29 is a pin 65 connected to one end of an L-shaped linkage 66. The center portion of linkage 66 is pivotally connected to side plate 28 by means of a pin 67 and linkage 66 has a clockwise bias applied thereto by means of a spring 69 connected between it and a pin 76 connected to side plate 28. The other end of linkage 66 is bent at a 90° angle so as to form a tab 68 which extends into cutout 24 in side plate 28. In this manner, tab 68 is in position to engage a tab 70 connected to a central portion of a cartridge ejector rod 71 which is positioned in a channel 72 in side plate 28. A spring 73 is positioned between one end of rod 71 and the closed end of channel 72 so as to bias rod 71 to the right as viewed in FIG. 4. Tab 70 engaging the right-hand side of cutout 24 limits movement of rod 71. However, rod 71 extends through wall 15 and includes a tab 74 adapted to be engaged by cartridge 12 when cartridge 12 is inserted into compartment 13. Rod 71 has a slot 75 therein.

From anchor 62, one end of cable 63 extends around a pulley 77 connected to one end of side plate 28 and then around a second pulley 78 connected to the other end of side plate 28. Immediately below pulley 78 is a third pulley 79 around which the other end of cable 63 extends. Pulleys 78 and 79 change the direction of cable 63 from a first plane parallel to side plate 28 to a second plane parallel to wall 15. It is the portion of cable 63 in the second plane which actuates shutter 17.

Referring now to FIGS. 5–9, wall 15, which defines the back of compartment 13, has a generally rectangular, large opening 81 therein. Positioned within opening 81 is a rectangular plate 82 having dimensions slightly smaller than the dimensions of opening 81. Plate 82 is connected to wall 15 by means of a rubber gasket 83 having a size slightly greater than opening 81. Plate 82 is secured to the back of gasket 83 and the rim of gasket 83 is secured to the front surface of wall 15. This arrangement permits limited movement of plate 82 in a direction perpendicular thereto. Openings 16 and 18 are actually formed by aligned openings in plate 82 and gasket 83.

Movement of plate 82 is under control of an actuating tab 84 extending perpendicularly from the rear surface thereof. Tab 84 is adapted to be contacted by one end of a pivotable, generally L-shaped arm 85, the other end of which is mounted for pivotal movement by means of a pin 86 connected to a body support plate 87. A spring 88 biases arm 85 toward tab 84 (FIGS. 5, 8 and 9).

Shutter 17 is a generally rectagular member positioned directly behind wall 15 and movable within a channel 90 formed between wall 15 and a wall 91 positioned in back thereof. Movement of shutter 17 is under control of cable 63 which is connected thereto by means of a pin 92. As shown most clearly in FIG. 6, the upper and lower portions of cable 63, after extending around pulleys 78 and 79, respectively, extend across shutter 17 and around a pair of pulleys 93 and 94 connected between walls 15 and 91. Thus, movement of the upper portion of cable 63 to the left as viewed in FIG. 6, will move shutter 17 therewith.

Shutter 17 has a cam surface 95 extending perpendicularly from the back wall thereof. Cam surface 95 is positioned to engage arm 85 when shutter 17 is in its closed position, shown in FIGS. 5–9. In this position, surface 95 engages arm 85 and moves same away from tab 84, compressing spring 88. As will be explained more fully hereinafter, movement of shutter 17 to the left, as viewed in FIG. 9, causes cam surface 95 to release arm 85 which moves forwardly under the pressure of spring 88 so as to engage tab 84 and to move plate 83 forwardly.

In operation, FIG. 3 shows the position of door 14 in its fully open position. In this position, elevator 44 is in its upwardmost position adapting for receipt of cartridge 12. As door 14 moves between the position shown in FIG. 3 and the position shown in FIG. 10, pins 38 and 38a travel through cam channels 37 and 37a, respectively, which has the effect of rotating arms 40 and 40a, respectively, in a counter-clockwise direction around pins 41. This rotation of arms 40 and 40a lowers elevator 44 and a cartridge 12 therein onto pins 97 which are adapted to engage a pair of slots in the bottom of cartridge 12 to hold cartridge 12 fixed and to prevent lateral movement thereof. The lowering of elevator 44 also brings cartridge 12 into engagement with the end of disk driving spindle 9. It should be noted that as door 14 moves from the position shown in FIG. 10 to the position shown in FIG. 12, pin 38 travels through cam channel 37 without being contacted thereby so that there is no further movement of elevator member 43.

If there is no cartridge 12 in channel 13 when door 14 is moved from the position shown in FIG. 3 to the position shown in FIG. 12, pin 55 slides within portion 53 of opening 52 and there is no rotation of linkage 56. In this regard, it should be noted that since spring 69 biases linkage 66 in a clockwise direction, pin 65 engages the top surface of arm 29 and holds arm 29 downwardly to ensure that pin 55 does not extend into portion 54 of opening 52. Thus, mechanism 25 cannot be activated unless a cartridge 12 is inserted into compartment 13.

Rod 71 is normally biased in its forward position (FIG. 4) by spring 72, in which position tab 74 is adapted to be engaged by cartridge 12 as cartridge 12 is inserted into compartment 13. As cartridge 12 is inserted into compartment 13, it engages tab 74 at the end of rod 71 and retracts rod 71, compressing spring 72. With door 74 in its open position (FIG. 3), insertion of cartridge 12 and retraction of rod 71 causes two events to occur. Initially, tab 70 engages tab 68 of linkage 66 so as to rotate linkage 66 in a counter-clockwise direction, stretching spring 69. Rotation of linkage 66 in a counter-clockwise direction lifts pin 65 off of arm 29 which permits spring 47 to elevate arm 29 to the position shown in FIG. 10 where pin 55 extends into portion 54 of opening 52. Continued retraction of rod 71 brings slot 75 into a position immediately above pin 51 connected to linkage 48. Linkage 48 is biased for rotation in a counter-clockwise direction by means of spring 47 so that at this time, linkage 48 rotates, extending pin 51 into slot 75. Thus, pin 51 latches rod 71, preventing spring 72 from moving rod 71 and permitting cartridge 12 to remain in compartment 13.

Mechanism 25 is now in its operative position, capable of activating shutter 17 and cartridge opener rod 26. It should therefore be particularly noted that until cartridge 12 is fully inserted into compartment 13 with wall 19 thereof parallel and close to wall 15, there can be no activation of shutter 17 and the doors which close openings 21 and 22 in cartridge 12.

At this time, as door 14 is rotated from the position shown in FIG. 3 to the position shown in FIG. 10, elevator member 43 is lowered, as explained previously. During this movement, pin 30 travels through cam channel 34 without linearly moving arm 29. On the other hand, upon reaching the position shown in FIG. 10, further movement of door 14 linearly moves arm 29 from the position shown in FIG. 10 to the position shown in FIG. 12. Because pin 55 is now held in portion 54 of opening 52 due to the action of spring 47, this movement causes pivotal movement of linkage 56 about pin 57 from the position shown in FIG. 10 to the position shown in FIG. 12. As the upper end of linkage 56 moves to the right, as viewed in FIGS. 10 and 12, opener rod 26 is moved forwardly from the position shown in FIG. 11 to the position shown in FIG. 13 as a result of arm 59 which interconnects linkage 56 and rod 26. Accordingly, it is the movement of door 14 from the position shown in FIG. 10 to the position shown in FIG. 12 that activates opener rod 26 to open the doors which seal openings 21 and 22 of cartridge 12.

As explained previously, it is the rotation of linkage 56 that also causes movement of cable 63. Movement of cable 63 during movement of door 14 from the position shown in FIG. 10 to the position shown in FIG. 12 causes movement of shutter 17 from the position shown in FIG. 9, where openings 16 and 18 are sealed, to the position shown in FIG. 15, where openings 16 and 18 are unobstructed by shutter 17. It should also be noted that as soon as shutter 17 begins its movement, cam surface 95 releases arm 85 so that arm 85 is forced forwardly under the action of spring 88, engaging tab 84 and pushing plate 82 forwardly. Plate 82 thus moves from the position shown in FIG. 9 to the position shown in FIG. 15, forcing gasket 83 against wall 19 of cartridge 12 (FIG. 15). This forms a tight seal between plate 82 and wall 19 by means of gasket 83. This tight seal ensures that dust and other contamination particles on cartridge 12 cannot enter the clean head environment.

In order to remove cartridge 12, door 14 is first moved from the position shown in FIG. 12 to the position shown in FIG. 10, which reverses the procedure just described, moving shutter 17 into its position obstructing openings 16 and 18, withdrawing cartridge door opener rod 26, and returning plate 82 to the position shown in FIG. 9. Further movement of door 14 allows elevator member 43 to elevate cartridge 12 off spindle 9 and pins 97.

Cam channel 34 is configured so that during the final few degrees of movement of door 14, arm 29 is moved forwardly. This slight forward movement of arm 29 causes an additional clockwise rotation of linkage 56 about pin 57. Linkage 56 engages pin 50 connected to linkage 48, causing a rotation of linkage 48 in a clockwise direction about its pivot pin 49. This has the effect of lowering pin 51 and removing it from slot 75. Removing pin 51 from slot 75 in rod 71 releases rod 71 so that spring 72 moves rod 71 from the position shown in FIG. 13 to the position shown in FIG. 4. This has the effect of ejecting cartridge 12 whereupon all portions of mechanism 25 are returned to their original positions awaiting reinsertion of cartridge 12 into compartment 13.

It can therefore be seen that according to the present invention, there is provided a cartridge loading mechanism for a removable cartridge magnetic disc storage system 10 in which the possibilities for contamination entry are eliminated. With system 10, a shutter 17 is incorporated into housing 11 so that the compartment containing the heads is sealed to outside contamination at all times when cartridge 12 is outside system 10. The doors on cartridge 12 as well as shutter 17 are not opened until cartridge 12 is fully inserted into system 10 and sealed to the head chamber by gasket 83. This provides for positive control against external contamination entry into the head flying environment.

While the invention has been described with respect to the preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

We claim:

1. In a magnetic disc storage system of the type including a housing having an open-ended compartment adapted for receipt of a disc cartridge, the cartridge including a housing having a wall having first and second openings therein, the first opening having a movable door extending thereacross, the second opening being adapted for receipt of an opener rod for opening and closing said door, a wall at the closed end of said compartment having an opening therein positioned to be aligned with said first opening in said cartridge housing wall, and a head carriage movable through said opening in said compartment wall and said first opening in said cartridge housing wall for engaging the disc in said cartridge, a door activation mechanism comprising:
 a movable shutter in said system housing adapted for movement between a first position sealing said opening in said compartment wall and a second position clear of said opening;
 means for moving said shutter;
 an opener rod mounted for linear movement in said system housing;
 means for moving said opener rod into said second opening in said cartridge housing wall for opening and closing said cartridge door; and
 means responsive to a cartridge being inserted into said compartment for inhibiting operation of said shutter moving means until said cartridge is fully inserted into said compartment.

2. In a magnetic disc storage system according to claim 1, of the type wherein said cartridge housing wall has a third opening therein across which said movable door extends and said compartment wall has a second opening therein positioned to be aligned with said third opening in said cartridge housing wall, a door activation mechanism wherein said movable shutter, in said first position thereof, seals said second opening in said compartment wall and, in said second position thereof, is clear of said second opening in said compartment wall.

3. In a magnetic disc storage system according to claim 1, a door activation mechanism further comprising:
 means for interconnecting said shutter moving means and said opener rod moving means for simultaneous movement of said shutter and said opener rod.

4. In a magnetic disc storage system according to claim 1, a door activation mechanism further comprising:
 a door pivotably connected to said system housing in position to seal the open end of said compartment, said shutter moving means and said opener rod moving means being operatively connected to said door for activation thereof as said door moves between an open position permitting insertion of a cartridge into said compartment and a closed position sealing said compartment.

5. In a magnetic disc storage system according to claim 1, a cartridge loading mechanism comprising:
 an elevator member in said system housing surrounding said compartment for receipt of said cartridge, said elevator member being adapted for vertical, linear movement to lower said cartridge onto a spindle for driving said disc.

6. In a magnetic disc storage system according to claim 5, further comprising:

a door pivotably connected to said system housing in position to seal the open end of said compartment, said shutter moving means and said opener rod moving means being operatively connected to said door for activation thereof as said door moves between an open position permitting insertion of a cartridge into said compartment and a closed position sealing said compartment.

7. In a magnetic disc storage system according to claim 6, a cartridge loading mechanism wherein said elevator member is operatively connected to said door for activation thereof as said door moves from said open position toward said closed position.

8. In a magnetic disc storage system according to claim 1, a door activation mechanism wherein said compartment wall has a second opening therein and further comprising:

a plate positionable in said second opening in said compartment wall, coplanar therewith;

a gasket connected to one side of said plate and to one side of said compartment wall, facing said compartment, for connecting said plate to said compartment wall; and means responsive to movement of said shutter for urging said plate into said compartment to bring said gasket into contact with said cartridge housing wall to form an air tight seal between said gasket and said cartridge housing wall, said first-mentioned opening in said compartment wall extending through said plate and said gasket.

9. In a magnetic disc storage system according to claim 1, a door activation mechanism wherein said inhibiting means comprises:

a cartridge ejector rod extending through said compartment wall into said compartment in position to be engaged by a cartridge extended thereinto; and means for biasing said cartridge ejector rod in said extended position, movement of a cartridge into said compartment to a fully inserted position moving said cartridge ejector rod to a fully retracted position.

10. In a magnetic disc storage system according to claim 9, a door activation mechanism wherein said inhibiting means further comprises:

means responsive to movement of said cartridge ejector rod to said fully retracted position for permitting operation of said shutter moving means and said opener rod moving means.

11. In a magnetic disc storage system according to claim 10, a door activation mechanism further comprising:

means responsive to retraction of said cartridge ejector rod to said fully retracted position for latching said cartridge ejector rod in said fully retracted position to prevent ejection of said cartridge.

12. In a magnetic disc storage system according to claim 11, a door activation mechanism further comprising:

means for releasing said cartridge ejector rod for ejecting said cartridge.

* * * * *